(12) United States Patent
Wahrlich (10) Patent No.: US 11,333,785 B2
(45) Date of Patent: May 17, 2022

(54) METAL DETECTOR

(71) Applicant: Minelab Electronics Pty. Limited, Mawson Lakes (AU)

(72) Inventor: Philip Shane Wahrlich, Mawson Lakes (AU)

(73) Assignee: Minelab Electronics Pty. Limited, South Australia (AU)

( * ) Notice: Subject to any disclaimer, the term of this patent is extended or adjusted under 35 U.S.C. 154(b) by 6 days.

(21) Appl. No.: 16/879,806

(22) Filed: May 21, 2020

(65) Prior Publication Data
US 2020/0371264 A1 Nov. 26, 2020

(30) Foreign Application Priority Data
May 21, 2019 (AU) .................................. 2019901724

(51) Int. Cl.
*G01V 3/10* (2006.01)
*G01V 3/165* (2006.01)

(52) U.S. Cl.
CPC ................ *G01V 3/10* (2013.01); *G01V 3/165* (2013.01)

(58) Field of Classification Search
CPC . G01V 3/165; G01V 3/38; G01V 3/15; G01V 3/107; G01V 3/104; G01V 3/105; G01V 3/12
See application file for complete search history.

(56) References Cited

U.S. PATENT DOCUMENTS

2006/0284758 A1* 12/2006 Stilwell ................. G01S 13/888
342/22
2015/0145517 A1* 5/2015 Candy ...................... G01V 3/10
324/329

* cited by examiner

*Primary Examiner* — Jermele M Hollington
*Assistant Examiner* — Suresh K Rajaputra
(74) *Attorney, Agent, or Firm* — The Webb Law Firm (57) ABSTRACT

A method for detecting a target using a metal detector, including: transmitting a transmit magnetic field using a transmitter; receiving a receive magnetic field due to the transmit magnetic field to produce a receive signal using a receiver and receive electronics; processing the receive signal using at least one function to produce an indicator output, wherein the at least one function is controllable such that the properties of the indicator output is controllable in terms of: (a) an amount of cancellation of signals due to soil; wherein the amount of cancellation of signals due to soil is higher than an amount of cancellation of signals due to the target; and (b) a sensitivity of the indicator output to the target and broadband electromagnetic interference (EMI); wherein controlling the at least one function in a particular direction changes the at least one function from a first state more suitable for high ground response environments to a second state more suitable for medium ground response environments; and controlling the at least one function again in the particular direction changes the at least one function from the second state more suitable for medium ground response environments to a third state more suitable for low ground response environments; and wherein when compared to the first state, the second state provides an indicator output that is more sensitive to a target, more sensitive to broadband EMI and more sensitive to the ground response; and when compared to the second state, the third state provides an indicator output that is more sensitive to a target, at least about as sensitive to broadband EMI and more sensitive to the ground.

6 Claims, 6 Drawing Sheets

METAL DETECTOR

CROSS-REFERENCE TO RELATED APPLICATION

This application claims priority to Australian Provisional Patent Application No. 2019901724 filed May 21, 2019, the disclosure of which is hereby incorporated by reference in its entirety.

TECHNICAL FIELD

The present disclosure relates to a metal detector.

BACKGROUND

The general forms of most metal detectors which interrogate soil are either handheld battery operated units, conveyor-mounted units, or vehicle-mounted units. Examples of handheld products include detectors used to locate gold, explosive land mines or ordnance, coins and treasure. Examples of conveyor-mounted units include fine gold detectors in ore mining operations, and examples of a vehicle-mounted unit include a unit to locate buried land mines.

These metal detectors usually, but not necessarily, consist of transmit electronics generating a repeating transmit signal cycle of a fundamental period, which is applied to an inductor, for example a transmit coil, which transmits a resulting varying magnetic field, sometimes referred to as a transmit magnetic field.

These metal detectors may also contain receive electronics that processes a receive signal from a measured receive magnetic field, such as the time derivative of the receive magnetic field, during one or more receive periods during the repeating transmit signal cycle, to produce an indicator output signal, the indicator output signal at least indicating the presence of at least a metal target within the influence of the transmit magnetic field.

During the processing of the receive signal, the receive signal is either sampled, or demodulated, and many be further processed, to produce the indicator output signal.

It is common that the indicator output signal is an audible signal to be interpreted by an operator or a user of the metal detector. In the case that the indicator output signal is an audible signal, characteristics of the audible signal such as volume and pitch are typically modulated to indicate the presence of at least a target within the influence of the transmit magnetic field. Other indicator output signals that are common include haptic feedback or tactile signals in the form of vibration signals, and visual signals in the form of real-time signal time series depictions or an instantaneous signal amplitude indication.

SUMMARY

According to a first aspect of the present disclosure, there is provided a method for detecting a target using a metal detector, including: transmitting a transmit magnetic field using a transmitter; receiving a receive magnetic field due to the transmit magnetic field to produce a receive signal using a receiver and receive electronics; processing the receive signal using at least one function to produce an indicator output, wherein the at least one function is controllable such that the properties of the indicator output is controllable in terms of: (a) a combination function of at least two functions of the receive signal, the combination function constructed to cancel signals due to the ground response relative to signals due to a target; and (b) a sensitivity of the indicator output to conductive objects and broadband electromagnetic interference (EMI) and the ground response; controlling the at least one function in a particular direction changes the at least one function from a first state more suitable for high ground response environments to a second state more suitable for medium ground response environments; and controlling the at least one function again in the particular direction changes the at least one function from the second state more suitable for medium ground response environments to a third state more suitable for low ground response environments; wherein when compared to the first state, the second state has an indicator output that is more sensitive to a target and more sensitive to EMI and more sensitive to the ground response; and wherein compared to the second state, the third state has an indicator output that is more sensitive to a target, at least about as sensitive to broadband EMI and more sensitive to the ground response and the combination function is changed such that the amount by which it is more sensitive to the ground response is more than the amount by which it is more sensitive to the target.

In one form, relative to the first state, in the second state, the sensitivity of the indicator output to signals due to conductive objects relative to signals due to soil is substantially maintained by substantially maintaining the combination function. In one form, wherein an overall sensitivity of the metal detector to the target increases moving from the first state to the second state, and from the second state to the third state. In one form, the controlling the at least one function is effected by a single push button, two push buttons, a single knob or a single virtual control on a touch panel.

According to a second aspect of the present disclosure, there is provided a non-transitory computer readable medium including instructions to perform the steps of the first aspect.

According to a third aspect of the present disclosure, there is provided a metal detector for detecting a target, including: a transmitter for transmitting a transmit magnetic field; a receiver and receive electronics for receiving a receive magnetic field due to the transmit magnetic field to produce a receive signal; a processor for: (i) processing the receive signal using at least one function to produce an indicator output, wherein the at least one function is controllable such that the properties of the indicator output is controllable in terms of: (a) a combination function of at least two functions of the receive signal, the combination function constructed to cancel signals due to the ground response relative to signals due to a target; and (b) a sensitivity of the indicator output to conductive objects and broadband electromagnetic interference (EMI) and the ground response; and (ii) controlling the at least one function in a particular direction changes the at least one function from a first state more suitable for high ground response environments to a second state more suitable for medium ground response environments; and controlling the at least one function again in the particular direction changes the at least one function from the second state more suitable for medium ground response environments to a third state more suitable for low ground response environments; wherein when compared to the first state, the second state has an indicator output that is more sensitive to a target and more sensitive to broadband EMI and more sensitive to the ground response; and wherein compared to the second state, the third state has an indicator output that is more sensitive to a target, at least about as sensitive to broadband EMI and more sensitive to the ground response and the combination function is changed such that the amount by which it is more sensitive to the ground response is more than the amount by which it is more sensitive to the target.

BRIEF DESCRIPTION OF THE DRAWINGS

Embodiments of the present disclosure will be discussed with reference to the accompanying drawings wherein.

DESCRIPTION OF EMBODIMENTS

In this specification, the term "targets" means intended objects to be found. For example, a target may be a gold nugget, a coin, a ring, a landmine, an Improvised Explosive Device (IED), depending on the application of the metal detector.

In this specification, the term "component" is used to refer to a part of a larger whole. When referring to a signal, a component of a signal means a part of a signal, and a superposition of all components of a signal, forms the signal.

During the operation of a metal detector to detect intended targets such as gold, explosive land mines or ordnance, coins or treasure, it is often beneficial to assess the unwanted responses of the metal detector due to the environment. This may involve an assessment of the response of the metal detector due to the ground. It may also involve an assessment of the response of the metal detector due to electromagnetic interference (EMI). With such assessment, the metal detector can be better configured to distinguish the intended targets from unwanted noise due to the environment. For example, by adjusting an effective threshold for triggering an alarm, the number of false alarms generated can be adjusted. If the number of false alarms is high enough that distinguishing the intended targets from the false alarms becomes difficult, then the effective threshold for triggering an alarm may be decreased. Typically, the properties of a user interface element such as an audible alert/sound are adjusted such that it is relatively insensitive to the noise due to the environment compared to the signal due to the intended targets. In an ideal case, only intended targets would generate an audible alert/sound. This increases the effectiveness of an operator or user of the metal detector in terms of detecting the presence of the intended targets based on the information provided by the user interface element, in part by reducing the number of false alarms due to the noise from the environment presented to the operator by the indicator output. The "noisiness" of the environment can be contributed by EMI and also by the magnetic and/or conductive response of the ground of the environment. For example, the environment where the detection is taking place can be an inner-city park, a place near a power transmission line, a highly mineralised goldfield, a low mineralised crop field near a small town etc.

EMI can be present in any part of the electromagnetic spectrum. For a metal detector, problematic sources of interference include the domestic power grid. EMI at the operating frequency of the domestic power grid (50 Hz or 60 Hz depending on the country) is generally not a problem for metal detectors since metal detectors often operate at higher frequencies (in the kHz range). However, harmonics of the operating frequency of the power grid exist in the operating frequency range of metal detectors and pose a substantial problem. Other sources of EMI include terrestrial VLF transmitters, lightning, and mobile phones. EMI can be broadband or narrowband. Narrowband EMI usually comprises a single frequency or a narrowband of interference frequencies. Narrowband EMI may be easily tuned out or filtered out. Broadband EMI is not of a discrete frequency. It occupies a relatively large part of the electromagnetic spectrum and may present a challenge to be removed as it may overlap with useful signals.

The ground of the environment can be "highly mineralised" soil containing substantial amounts of ferromagnetic and superparamagnetic minerals, and also be saline or alkaline, which exhibits substantial conductivity, which will generate a response when within an influence of the transmit magnetic field of the metal detector.

Accordingly, the operator of the metal detector should take into consideration the responses due to the environment such as EMI and signals due to the ground, and change one or more functions used to process received signals to generate a processed signal. By doing so, the output signal can more easily be used to distinguish alerts due to targets from alerts due to the environment. Sometimes such a function is a demodulation function. In one form, a function is a synchronous demodulation function. Demodulation functions can be constructed to cancel or partially cancel the response from the soil in a manner which reduces the response from the soil in order to reduce the number of false alarms due to the soil. Sometimes such a function is an effective threshold that determines the signal above which an alert is generated. Sometimes such a function is a gain which amplifies a signal relative to an effective threshold that determines the signal above which an alert is generated. The latter two functions directly control the sensitivity of the metal detector to all responses.

For example, some known metal detectors are provided with two controls, one to control the sensitivity of the metal detector, the other one to control the amount of soil cancellation included in a processing step. The sensitivity of the metal detector refers to how sensitive the indicator output is with respect to the receive magnetic field. Sensitivity can be increased by increasing the gain of the received signals relative to a threshold of detection. This can be achieved by increasing the gain of the receiving electronics or digitised signals. Sensitivity can also be increased by decreasing a threshold of detection relative to the received signals.

The term "sensitivity" may mean how likely a metal detector is to generate an alert on a target, regardless of how many false positives it generates. A metal detector with high "sensitivity" can be, for example, a metal detector with a very high gain or very low threshold of detection. Such a metal detector is likely to generate an alert on targets, but will also generate many false positive detections. Statistically, sensitivity is a measure of the performance of a binary classification test. In the context of metal detection, the two classes are detection (positive) and non-detection (negative), or alert (positive) and non-alert (negative). Generally, a signal is compared to a threshold of detection, and if the signal is above the threshold of detection, a detection event or alert is generated. A detection or alert which correctly indicates the presence of a target when a target is present is considered a "true positive". Whereas a detection or alert which incorrectly indicates the presence of a target when no target is present is considered a "false positive". Statistically, we can define sensitivity=number of true positives/(number of true positives+number of false negatives). It is known that the response from the soil can be reduced by appropriate application of an effective demodulation function to the receive signal or by subtracting fitted soil models from the receive signal or by subtracting components measured at different frequencies. Examples of such methods are disclosed in WO 2008/040089, U.S. Pat. No. 4,942,360A, WO2014/172751, and U.S. Pat. No. 5,654,638A. It is found that using such methods substantially reduces the response from the soil, however these methods also reduce the response from targets, generally by a lesser amount than the soil response reduction.

In situations where the response from the soil is the dominant source of noise in the indicator output used to determine target detection events, reducing the response from the soil can be beneficial. In this situation the overall noise in the indicator output used to determine target detection events can be reduced by more than the response from targets, leading to an increase in the signal to noise ratio and therefore potentially increased maximum depth of detection of a particular target.

In situations where the noise generated by the response from the soil is comparable to or smaller than other noise components in the indicator output used to determine target detection events, reducing the response from soil can be harmful. In these situations the overall noise in the indicator output used to determine target detection events may not be reduced by more than the response from targets, leading to a decrease in the signal to noise ratio. That is, known soil cancellation methods generally reduces the sensitivity to targets, and applying these methods in situations whether the dominant noise floor is not due to soil needlessly decreases the sensitivity of targets without a correspondingly larger decrease in the noise floor.

It is a widely misconceived idea that it is best to set the sensitivity of a metal detector to the highest allowable setting and set the soil cancellation of the metal detector to the maximum available capacity. Doing so often would not likely optimise the performance of a metal detector. The reason is that when the environment is "noisy", simply increasing the sensitivity would also mean increasing the noise. Similarly, when there is not much unwanted noise due to the soil, too much soil cancellation would reduce the signal from the intended targets, thus reducing the performance of the metal detector to detect the intended targets. For example, the detection depth may reduce when the soil cancellation increases.

Further, as mentioned before, some known metal detectors are provided with two controls, one to control the sensitivity of the metal detector, the other one to control the amount of soil cancellation. The two separate controls present a challenge to an operator or user of those metal detectors regarding how to choose the best settings for the two controls. For example, if the indicator output is noisy, it may not be clear to the operator whether he/she should decrease sensitivity or increase soil cancellation. Conversely, if the indicator output is not noisy, the operator may not be confident as to whether he/she should increase sensitivity or decrease soil cancellation. It is not uncommon for the operator to make the wrong choice and to consequently configure the metal detector in a way that reduces the ability of the operator to detect targets.

The present disclosure presents an alternative to the two separate controls of the sensitivity of a metal detector and the amount of soil cancellation from the receive signal. In one form, it combines the control of the sensitivity and the amount of soil cancellation into one single control. Further, by activating the control in a particular trend or direction, the sensitivity of the metal detector is increased while the amount of soil cancellation is decreased.

In one form, rather than having two separate controls, one for controlling sensitivity of the metal detector to targets and one for controlling the amount of soil cancellation, the two controls are merged into one in a meaningful way, such that in a particular direction of changing a single control, the metal detector (or one or more functions used to process the receive signals) changes from a first state more suitable for high ground response environments to a second state more suitable for medium ground response environments; and controlling the at least one function again in the particular direction changes the at least one function from the second state more suitable for medium ground response environments to a third state more suitable for low ground response environments; wherein when compared to the first state, the second state has an indicator output that is more sensitive to a target and more sensitive to broadband EMI and more sensitive to the ground response; and wherein compared to the second state, the third state has an indicator output that is more sensitive to a target, at least as sensitive to broadband EMI and more sensitive to the ground response and the combination function is changed such that the amount by which it is more sensitive to the ground response is more than the amount by which it is more sensitive to the target.

The phrase "in a particular direction of changing a single control" or "controlling in a particular direction" is to be understood to mean changing the control in a predefined order which may be reversible, in a reverse order. As a very simple example, consider a set of four settings in predefined order of A, B, C and D. If the setting is originally set at A, controlling a change in the settings in a particular direction means changing A to B. If the change is continuing, B will then change to C, then D. This feature of "controlling in a particular direction", and its equivalent, are useful as they allow a common sense change in settings which is easily understood by an operator of a metal detector.

Figure 1:
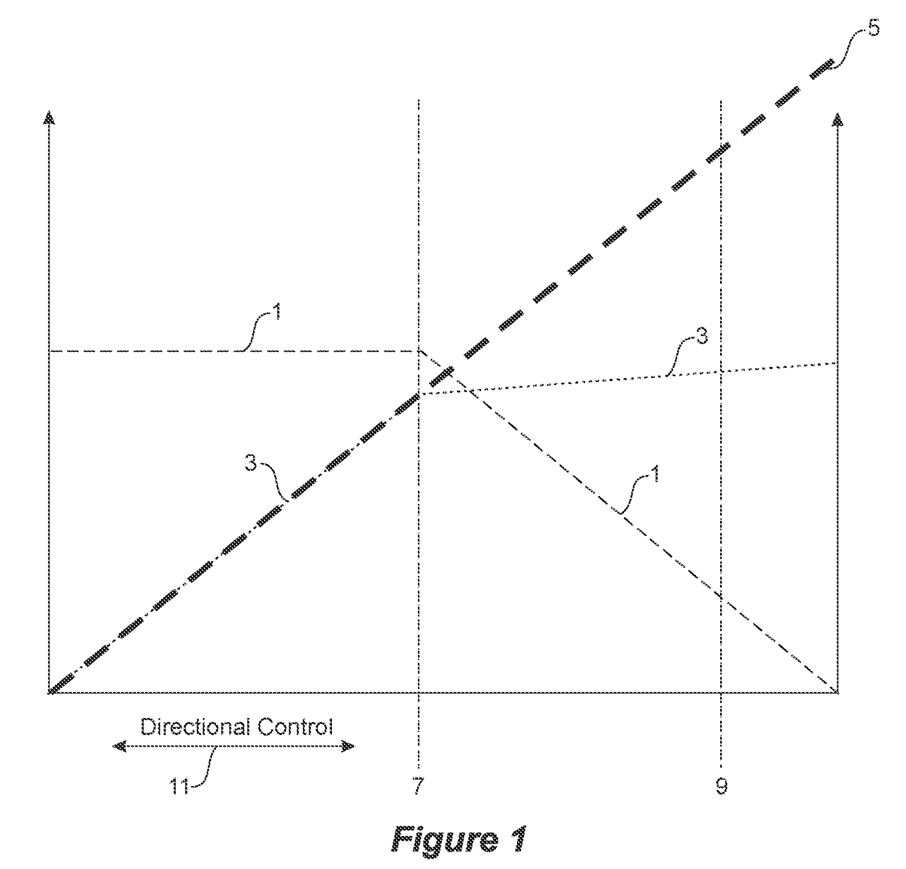
FIG. 1 depicts one embodiment of the present disclosure where adjusting a control in a particular direction changes an output of a metal detector.

Referring to FIG. 1, the control of the present disclosure is not arbitrary and involves careful understanding on the relationship between sensitivity and soil cancellation. FIG. 1 depicts one embodiment of the present disclosure. In this example, trace 1 represents the amount of soil cancellation; trace 3 as the overall gain or effective gain applied by the receive electronics on the receive signal; trace 5 as the effective sensitivity. Further, lines 7 and 9 are used to indicate three control zones: Zone A being the zone to the left of line 7; Zone B being the zone between lines 7 and 9; and Zone C being the zone to the right of line 9. Two directional arrows 11 represent control direction, to the left is a control direction or control trend to reduce the effective sensitivity of the metal detector while to the right is an opposite control direction or control trend to increase the effective sensitivity of the metal detector.

As can be seen, in Zone A, the soil cancellation is kept high with increasing gain from left to right. This functions like a conventional Pulse Induction (PI) metal detector or metal detector with PI-like transmit waveform. In Zone B and Zone C, in accordance with the present disclosure, the sensitivity of the metal detector increases as the amount of soil cancellation decreases. In Zone C, the metal detector behaves like a conventional VLF detector. In Zone B, the metal detector behaves like a hybrid detector. In practice, when the soil is low mineralisation soil, then it is better to have the control within Zone B and C. When the soil is high mineralisation soil, then it is better to have the control within Zone A.

Figure 2:
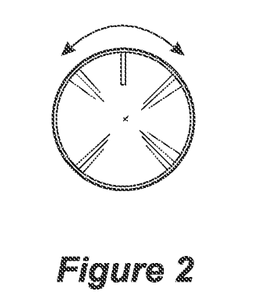
FIG. 2 depicts a single control, taking the form of a knob, which combines the control of the sensitivity and the amount of soil cancellation.

FIG. 2 depicts a single knob to control the sensitivity of a metal detector and the amount of soil cancellation from receive signals of a metal detector. When turned to one extreme (for example to the left most), the effective sensitivity of the metal detector is at the lowest; and when turned to an opposite extreme (for example to the right most), the effective sensitivity of the metal detector is at the highest. At the same time, the amount of soil cancellation is at its highest when the knob is turned to left most; and at its lowest when the knob is turned to the right most.

Of course, there are many other forms of controls to control the sensitivity, such examples as a push button, a lever control, a control bar etc. Another example is a touch screen with a graphical user interface designed to receive instruction to increase or decrease the effective sensitivity of a metal detector.

Figure 3:
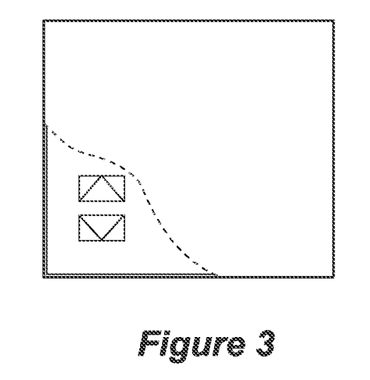
FIG. 3 depicts an alternative to the single control of FIG. 2.

FIG. 3 depicts a part of a touch screen with two icons; one representing up and the other down. When the up is pressed, the metal detector increases its effective sensitivity by having increasing gain and controlling the amount of soil cancellation. An example is shown in FIG. 1.

The disclosure is further explained in greater detail based on the following example.

Figure 4:
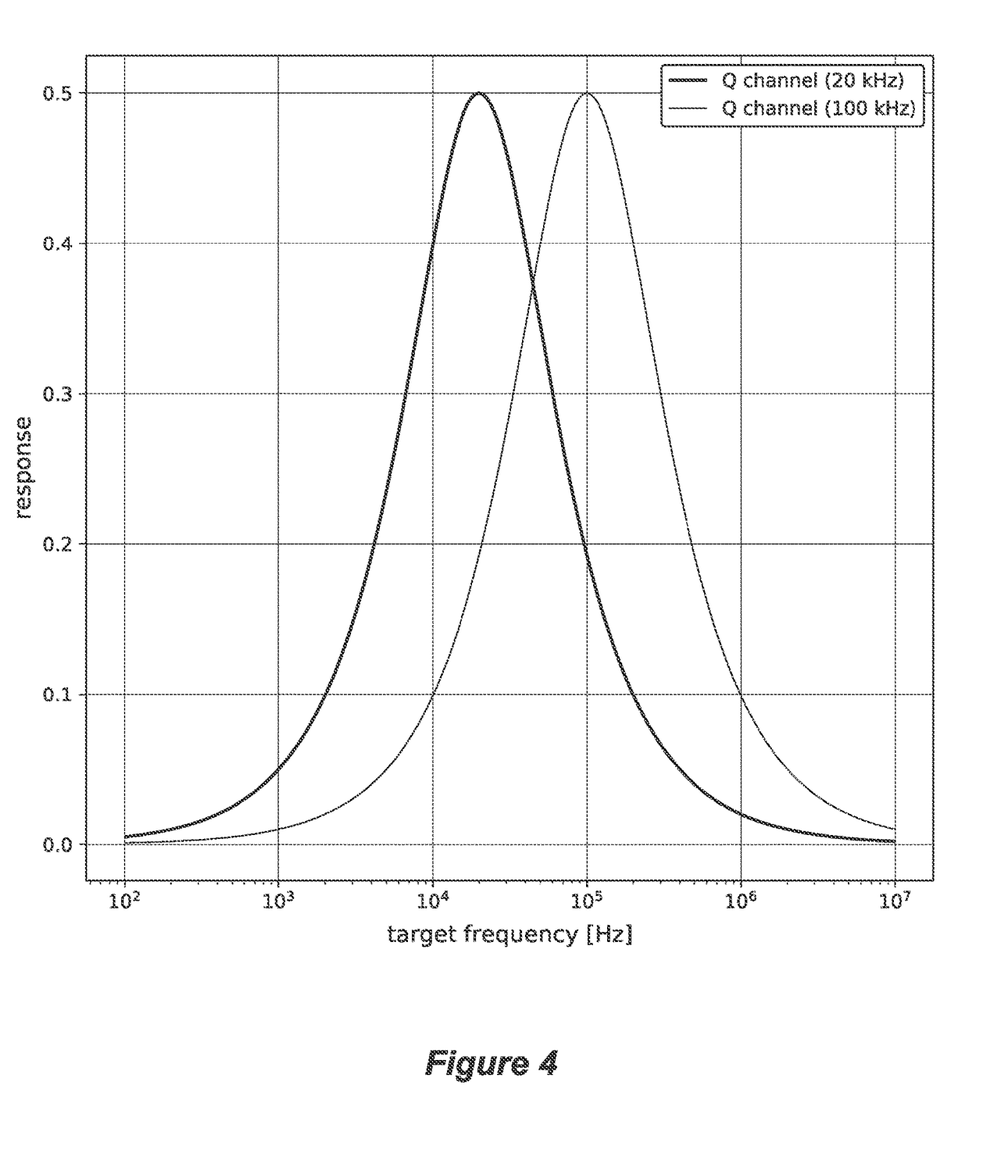
FIG. 4 depicts the response of two quadrature channels to first-order targets of a range of different characteristic frequencies. The two quadrature channels are demodulated from 20 kHz and 100 kHz.

Consider a multi-frequency metal detector transmitting and receiving at both 20 kHz and 100 kHz. Performing I/Q demodulation at both frequencies produces in-phase and quadrature channels corresponding to each frequency. So we have four channels: $I\_1$, $Q\_1$, $I\_2$ and $Q\_2$, which are the in-phase channel from 20 kHz, quadrature channel from 20 kHz, in-phase channel from 100 kHz, and quadrature channel from 100 kHz respectively. For simplicity, we'll discard both of the in-phase channels, though these channels may also be usefully included. The response Q(f) of the quadrature channels to a first-order target of characteristic frequency f given a transmit frequency $f_{Tx}$ is well-known, and given by $Q(f)=\alpha/(1+\alpha^2)$ where $\alpha=f_{Tx}/f$. The response of the quadrature channels as a function of a first-order target characteristic frequency is shown in FIG. 4.

Figure 5:
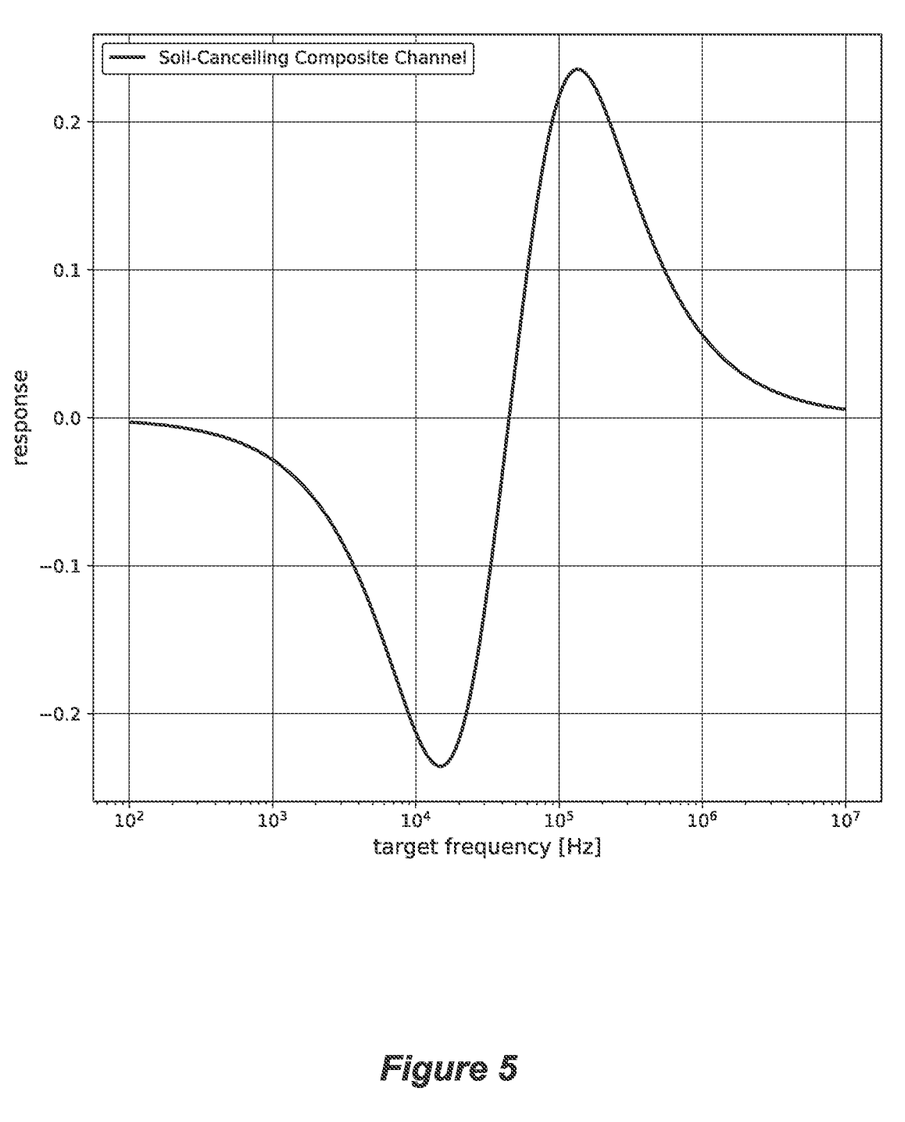
FIG. 5 depicts the response of a soil-cancelling composite channel to first-order targets of a range of different characteristic frequencies. The soil-cancelling composite channel is constructed by subtracting the 20 kHz quadrature channel from the 100 kHz quadrature channel.

It is also well-known that the response of both quadrature channels from superparamagnetic soil is approximately equal. Therefore, we can construct a composite channel as the difference between the two quadrature channels, that is $Q\_2-Q\_1$, and this composite channel will be substantially insensitive to the response from superparamagnetic soil. The response of this composite channel as a function of a first-order target characteristic frequency is shown in FIG. 5. Note that a consequence of this channel composition is that the response to first-order targets of many characteristic frequencies has decreased relative to the individual quadrature channel responses.

In many environments it is not necessary to completely cancel the response from the soil in order to achieve a high-performance metal detector. Instead, we merely wish to cancel enough of the response from the soil such that the response from the soil is not distinguishable above other noise sources such as electronic noise. Further cancellation of the response from the soil is, at that point, likely to decrease the response from targets by more than the overall noise floor of the metal detector and is thus undesirable.

We can generate a set of composite channels with differing amounts of soil response cancellation by adjusting the linear combination of $Q\_1$ and $Q\_2$. Suppose we construct seven (7) composite channels with the following linear combinations:

$$C\_6=Q\_2$$

$$C\_5=-0.290Q\_1+0.957Q\_2$$

$$C\_4=-0.520Q\_1+0.854Q\_2$$

$$C\_3=-0.707Q\_1+0.707Q\_2$$

$$C\_2=-0.530Q\_1+0.530Q\_2$$

$$C\_1=-0.354Q\_1+0.354Q\_2$$

$$C\_0=-0.177Q\_1+0.177Q\_2$$

If we assume the noise on both $Q\_1$ and $Q\_2$ is uncorrelated and of equal variance, the noise standard deviation N ($C\_i$) of each channel $C\_i$ is given by $N(C\_i)=\sqrt{a^2+b^2}=1$, where a and b are the coefficients of the $Q\_1$ and $Q\_2$ channels respectively, so we have:

$$N(C\_6)=\sqrt{(0.000)^2+(1.000)^2}=1.00$$

$$N(C\_5)=\sqrt{(-0.290)^2+(0.957)^2}=1.00$$

$$N(C\_4)=\sqrt{(-0.520)^2+(0.854)^2}=1.00$$

$$N(C\_3)=\sqrt{(-0.707)^2+(0.707)^2}=1.00$$

$$N(C\_2)=\sqrt{(-0.530)^2+(0.530)^2}=0.75$$

$$N(C\_1)=\sqrt{(-0.354)^2+(0.354)^2}=0.50$$

$$N(C\_0)=\sqrt{(-0.177)^2+(0.177)^2}=0.25$$

Also, if we assume unit soil response in both $Q\_1$ and $Q\_2$, then the soil response $S(C\_i)$ in the channel $C\_i$ relative to the soil response in $C\_6$ is:

$$S(C\_6)=1.00$$

$$S(C\_5)=0.67$$

$$S(C\_4)=0.33$$

$$S(C\_3)=0.00$$

$$S(C\_2)=0.00$$

$$S(C\_1)=0.00$$

$$S(C\_0)=0.00$$

Figure 6:
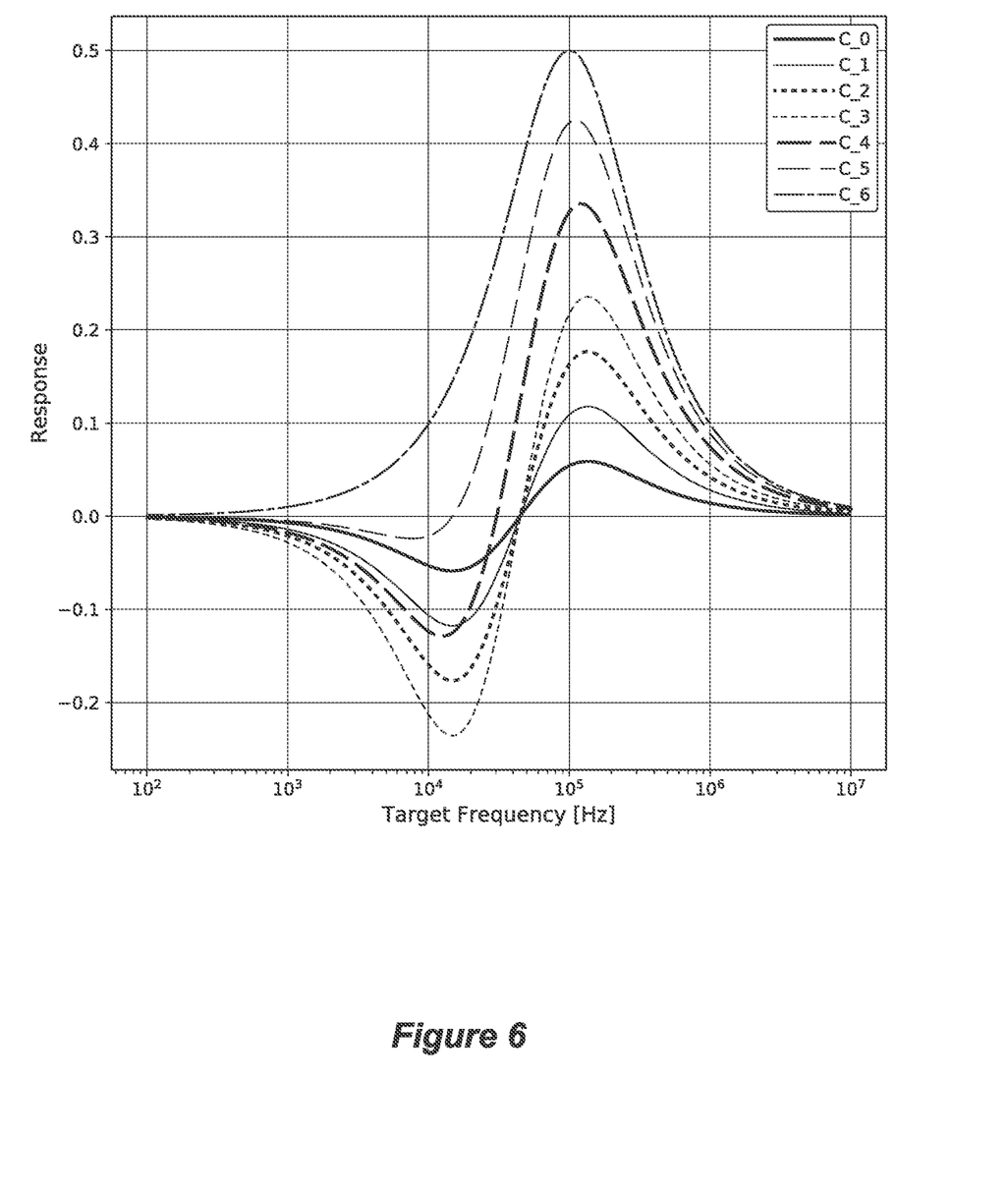
FIG. 6 depicts the responses of a set of composite channels to first-order targets of a range of different characteristic frequencies. Each composite channel is constructed as a linear combination of the 20 kHz quadrature channel and the 100 kHz quadrature channel.
Figure 7:
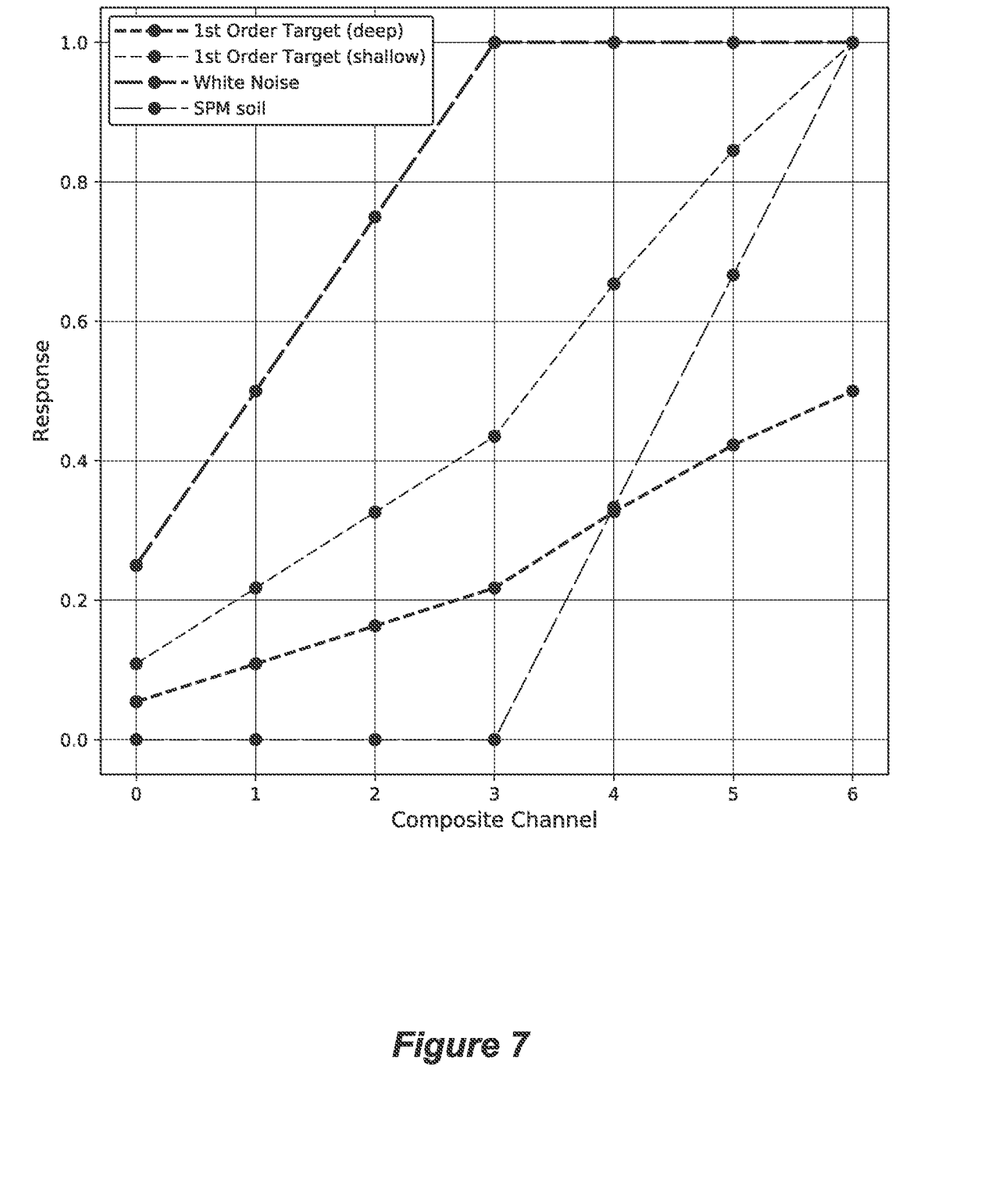
FIG. 7 depicts the relative responses to a first-order target with a characteristic frequency of 100 kHz, white noise, and superparamagnetic (SPM) soil.

The response of the set of composite channels as a function of first-order target characteristic frequency is shown in FIG. 6. In FIG. 7 we show the response of each composite channel to a first-order target with characteristic frequency 100 kHz, as well as the response to white noise and the soil response. The scale of each of the shown responses is arbitrary. For a first-order target located close to the search coil the scale of the response will typically be higher compared to the same first-order target located far from the search coil. For highly mineralised superparamagnetic (SPM) soil, the soil response will typically be larger compared to relatively low mineralised SPM soil. For environments with high amounts of broadband EMI the white noise response will be higher compared to environments with low amounts of broadband EMI.

Figure 8:
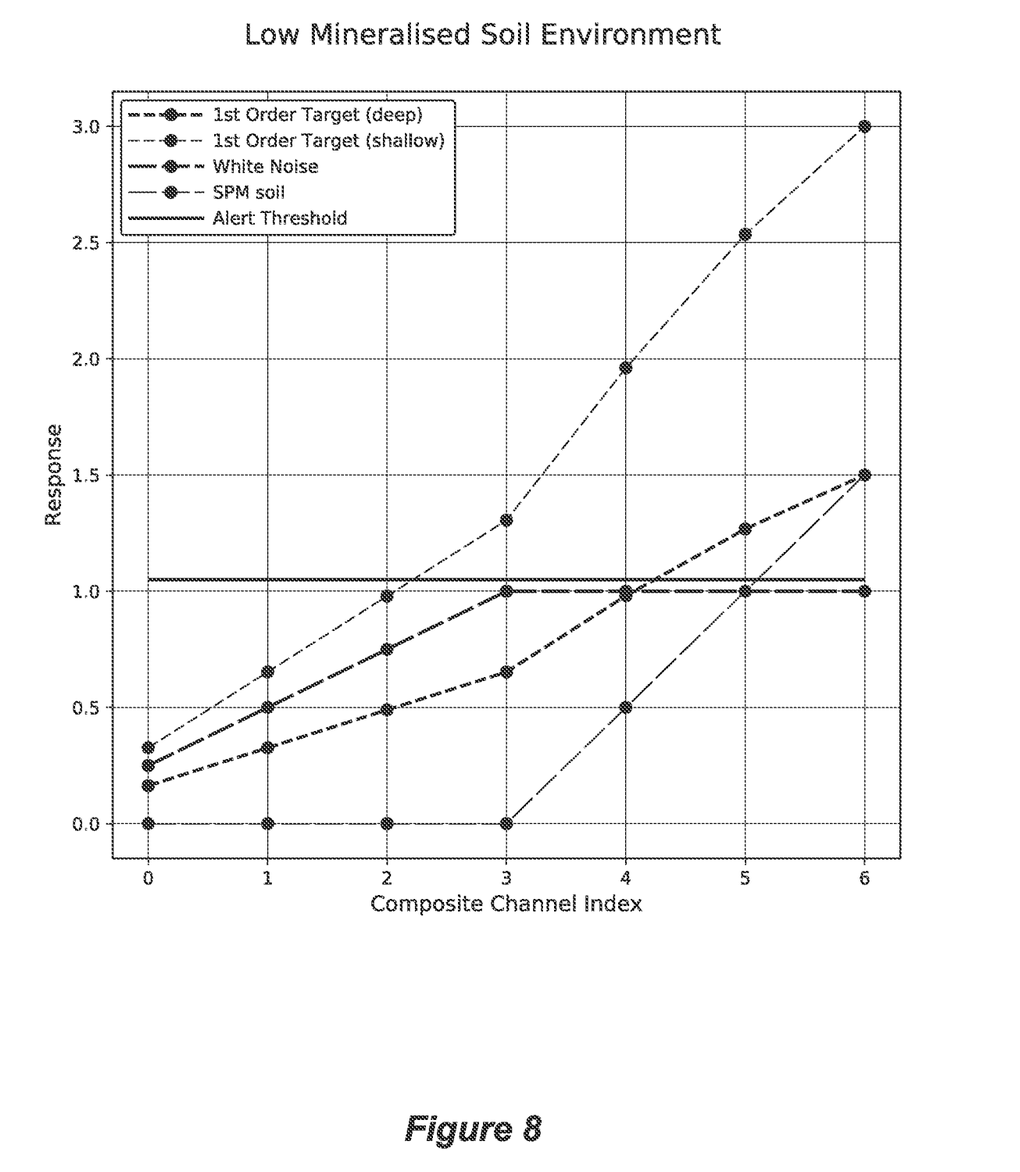
FIG. 8 explains how the disclosure works using a scenario with low level of signals due to soil.

In FIG. 8 we show the response of each composite channel to the following: a shallow-buried first-order target with characteristic frequency 100 kHz, a deep-buried first-order target with characteristic frequency 100 kHz, electronic noise (with a white noise property), low mineralised SPM soil response. In this example, the shallow-buried first-order target gives a response that is twice as large as the deep-buried first-order target. We also show the alert threshold above which a response will generate an alert. This threshold is not user controllable and is designed to be slightly higher than the electronic noise of the metal detector so that the electronic noise of the metal detector is unlikely to generate alerts.

The operator of the metal detector can control the selected combined channel to be used to generate alerts. The control is such that each time the control is increased the index i of the combined channel $C\_i$ is incremented by 1, up to $C\_6$, and each time the control is decreased the index i of the combined channel $C\_i$ is decremented by 1, down to $C\_0$.

In the scenario shown in FIG. 8, suppose the state of the control is such that $C\_2$ is selected. The operator then uses the metal detector and will notice that no alerts are generated by either the response from the soil nor EMI. This can be seen in FIG. 8 since for $C\_2$ both the SPM soil response and the white noise response are below the alert threshold. Given that no alerts are being generated by the environment, the operator, seeking to increase the sensitivity of the detector to targets, should increase the control. Increasing the control causes $C\_3$ to be selected instead of $C\_2$. If the operator subsequently uses the metal detector there will still be no alerts generated by either the response from the soil nor EMI. This can be seen in FIG. 8, since for $C\_3$ both the SPM soil response and the white noise response are below the alert threshold. The metal detector is now capable of detecting the shallow-buried first-order target. This can be seen in FIG. 8, since for $C\_3$ the shallow-buried first-order target response is now higher than the alert threshold. Note that both $C\_2$ and $C\_3$ employ the same ratio of $Q\_1$ and $Q\_2$ as a linear combination, which cancels the response from SPM soil. The linear combinations used in $C\_2$ and $C\_3$ differ only be a scaling factor. Since the electronic noise floor for $C\_3$ is now just below the alert threshold, were the gain of the linear combination slightly higher, false alarms may be generated due to electronic noise.

Up to this point, referring to FIG. 8, we have described essentially the operation of the control present in conventional metal detectors that employ SPM soil response cancellation. That is, a conventional metal detector that employs SPM soil response cancellation typically has a sensitivity control that controls that gain of a SPM-calling channel relative to an alert threshold as is the case for states $C\_0$ to $C\_3$. Since the electronic noise is now just below the alert threshold, this point defines essentially the maximum sensitivity of such a conventional metal detector to first-order targets without introducing false positive responses. However the present disclosure describes a system which allows a higher level of sensitivity to first-order targets without introducing a false positive response and without introducing an additional user control as follows.

Continuing to refer to FIG. 8, given that no alerts are being generated still, the operator, seeking to increase the sensitivity of the detector to targets, should increase the control again. Increasing the control again causes $C\_4$ to be selected instead of $C\_3$. If the operator subsequently uses the metal detector there will still be no alerts generated by either the response from the soil nor EMI. This can be seen in FIG. 8 that, for $C\_4$, both the SPM soil response and the white noise response are below the alert threshold. Note that $C\_4$ has an increased response from first-order targets while having the same response to white noise compared to $C\_3$. This is achieved by producing $C\_4$ from a linear combination that cancels less of the soil response, and consequently also cancels less of the first-order target response compared to the linear combination of $C\_3$. Given that no alerts are being generated still, the operator, seeking to increase the sensitivity of the detector to targets, should increase the control again. Increasing the control again causes $C\_5$ to be selected instead of $C\_4$. If the operator subsequently uses the metal detector there will still be no alerts generated by either the response from the soil nor EMI. This can be seen in FIG. 8, since for $C\_5$ both the SPM soil response and the white noise response are below the alert threshold. The metal detector is now capable of detecting both the shallow-buried first-order target and the deep-buried first-order target. This can be seen in FIG. 8, since for $C\_5$ both the shallow-buried first-order target response and the deep-buried first-order target response are now higher than the alert threshold. Note that $C\_5$ has an increased response from first-order targets while having the same response to white noise compared to $C\_4$. This is achieved by producing $C\_5$ from a linear combination that cancels less of the soil response, and consequently also cancels less of the first-order target response compared to the linear combination of $C\_4$. Given that no alerts are being generated still, the operator, seeking to increase the sensitivity of the detector to targets, should increase the control again. Increasing the control again causes $C\_6$ to be selected instead of $C\_5$. If the operator subsequently uses the metal detector there will be alerts generated by the response from the SPM soil. This can be seen in FIG. 8, since for $C\_6$ both the SPM soil response is above the alert threshold. Given that false alarms are now being generated by the metal detector, the operator may then choose to decrease the control. Decreasing the control causes $C\_5$ to be selected instead of $C\_6$. If the operator subsequently uses the metal detector there will once again be no alerts generated by either the response from the soil nor EMI.

Further signal processing techniques may then be used to discriminate the deep target from the deeper target, and to reduce or remove the signals due to soil from the output signal. Such signal processing techniques may take many forms and a person skilled in the art would know several commonly used techniques, thus they are omitted from this disclosure.

Those of skill in the art would understand that information and signals may be represented using any of a variety of technologies and techniques. For example, data, instructions, commands, information, signals, bits, symbols, and chips may be referenced throughout the above description and may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement or any form of suggestion that such prior art forms part of the common general knowledge.

It will be appreciated by those skilled in the art that the invention is not restricted in its use to the particular application described. Neither is the present disclosure restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for detecting a target using a metal detector, including:
   transmitting a transmit magnetic field using a transmitter;
   receiving a receive magnetic field due to the transmit magnetic field to produce a receive signal using a receiver and receive electronics;
   processing the receive signal using at least one function to produce an indicator output, wherein the at least one function is controllable such that the properties of the indicator output is controllable in terms of:
   (a) an amount of cancellation of signals due to soil; wherein the amount of cancellation of signals due to soil is higher than an amount of cancellation of signals due to the target; and
   (b) a sensitivity of the indicator output to the target and broadband electromagnetic interference (EMI);
   wherein controlling the at least one function in a particular direction changes the at least one function from a first state more suitable for high ground response environments to a second state more suitable for medium ground response environments; and controlling the at least one function again in the particular direction changes the at least one function from the second state more suitable for medium ground response environments to a third state more suitable for low ground response environments; and wherein when compared to the first state, the second state provides an indicator output that is more sensitive to a target, more sensitive to broadband EMI and more sensitive to the ground response; and when compared to the second state, the third state provides an indicator output that is more sensitive to a target, at least about as sensitive to broadband EMI and more sensitive to the ground.

2. The method of claim 1, wherein relative to the first state, in the second state, the sensitivity of the indicator output to signals due to conductive objects relative to signals due to soil is substantially maintained by substantially maintaining the amount of cancellation of signals due to the soil relative to the amount of cancellation of signals due to the target.

3. The method of claim 1, wherein an overall sensitivity of the metal detector to the target increases moving from the first state to the second state, and from the second state to the third state.

4. The method of claim 1, wherein the controlling the at least one function is effected by a single push button, two push buttons, a single knob, a single virtual control on a touch panel or single virtual control that is adjusted automatically based on the receive signal.

5. A non-transitory computer readable medium including instructions to perform the steps of claim 1.

6. A metal detector for detecting a target, including:
   a transmitter for transmitting a transmit magnetic field;
   a receiver and receive electronics for receiving a receive magnetic field due to the transmit magnetic field to produce a receive signal;
   a processor for:
   (i) processing the receive signal using at least one function to produce an indicator output, wherein the at least one function is controllable such that the properties of the indicator output is controllable in terms of:

(a) an amount of cancellation of signals due to soil; wherein the amount of cancellation of signals due to soil is higher than an amount of cancellation of signals due to the target; and
(b) a sensitivity of the indicator output to the target and broadband electromagnetic interference (EMI);
(ii) wherein controlling the at least one function in a particular direction changes the at least one function from a first state more suitable for high ground response environments to a second state more suitable for medium ground response environments; and controlling the at least one function again in the particular direction changes the at least one function from the second state more suitable for medium ground response environments to a third state more suitable for low ground response environments; and wherein when compared to the first state, the second state provides an indicator output that is more sensitive to a target, more sensitive to broadband EMI and more sensitive to the ground response; and when compared to the second state, the third state provides an indicator output that is more sensitive to a target, at least about as sensitive to broadband EMI and more sensitive to the ground response.

* * * * *